PROCESS FOR APPLYING ELECTRODES ON SEMICONDUCTORS

Filed May 1, 1961

INVENTOR
GEORGES M. FEUILLADE
JEAN R. DELMAS

BY Otto John Munz
ATTORNEY 3,153,600
Patented Oct. 20, 1964

3,153,600

PROCESS FOR APPLYING ELECTRODES ON SEMICONDUCTORS

Georges M. Feuillade, 35 Rue de Metz, Courbevoie, and Jean R. Delmas, 8 Blvd. Pasteur, Paris, France Filed May 1, 1961, Ser. No. 106,665
Claims priority, application France, June 15, 1960, 830,079
8 Claims. (Cl. 117—213)

Figure 1:
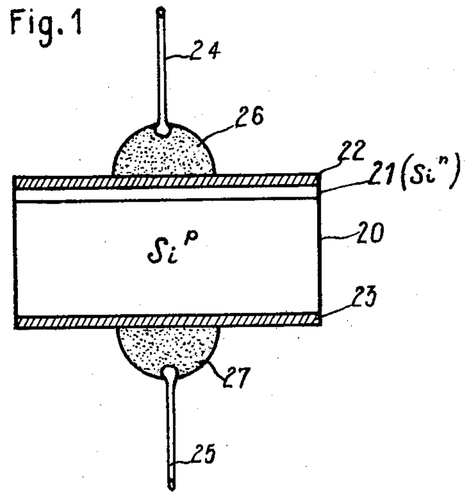

This invention relates to improved processes for producing ohmic contacts to semiconductor devices and specifically to silicon.

It is well known that, to utilize semiconductor elements in electrical assemblies, they must be equipped with contacts presenting good mechanical and electrical qualities. In particular, the so-called ohmic contacts should have very low electrical resistances and should not act as rectifiers. For germanium semiconductor elements, the problem of obtaining good ohmic contacts does not present great difficulties, for conventional alloys with low melting point moisten the germanium surface, which facilitates the welding operations. With silicon semiconductor elements it is more difficult to obtain good ohmic contacts for, without special preparation, the silicon surface is not moistened by the conventional welds.

Two types of processes are known in order to make such ohmic contacts, by simple adhesion or by alloyage between metal and semiconductor.

The adhesion processes consist in depositing on the silicon surface, by electroplating, electroless plating, displacement plating or vapor coating, an unrelated metallic layer intended to serve as intermediary between the silicon and the connecting wire weld.

A number of techniques for making such contacts are reviewed and appraised in chapter 6 of F. J. Biondi's work under the title of "Transistor Technology," volume III, published by D. Van Nostrand Company Inc., pages 163 to 174.

The vapor coating technique presents appreciable advantages for the establishment of ohmic contacts owing to the cleanliness, the absence of oxidation of the parts to be metallized under heat, and the possibilities offered to deposit successively or simultaneously different metals. This technique is described in F. J. Biondi's work quoted above in chapter 7, pages 231 to 237, where it is utilized in view of forming junctions, by alloyage, between the silicon and the metal (aluminium or gold containing antimony deposited on its surface).

The conventional method of vapor coating consists in vaporizing a metal by heat in a vacuum chamber, in which the vacuum is such that most of the atoms of the vaporized metal are sent in straight line towards the part to be metallized.

Ohmic contacts have thus been made by evaporating in vacuo, copper, gold, silver or rhodium on silicon crystals, the connecting wires being welded directly on these deposited films.

Unfortunately, the contacts thus obtained are not strictly ohmic and their electrical resistances are too high.

An appreciable improvement of the classical method mentioned above has been proposed by the second named applicant of the present patent in his French Patent No. 1,246,813 of October 10 1959, for "Improvement in the Manufacture of Semi-conductor Elements."

The process described in this latter patent concerns a method for obtaining ohmic contacts on silicon crystals presenting one or several junctions by depositing (according to the vapor coating technique without heating the silicon to more than 250° C. and, consequently, without causing any alloyage), two metallic films, the first of which, in contact with the silicon, is made of very pure chromium while the second, placed upon the first without any intermediary handling, is made of a metal adhering well to the chromium and easily welded by means of classical welds.

This process has the advantage that it can be applied to the most fragile structures whose rectifier layers' thickness is less than 1 micron. In addition, this same process permits to obtain ohmic contacts with a resistance of less than 10 ohms per square millimeter for a N-type or P-type silicon crystal, whose resistivity is about 1 ohm-centimeter.

Thanks to the alloying processes—that can be applied in all cases where the devices can undergo without injury the necessary thermal treatment—a more intimate contact between metal and semiconductor is obtained and, consequently, such a contact has a lower electric resistance.

A first well-known process for making contacts by alloying consists in forming, on the crystal surface, by heat treatment, an alloy between the silicon and the metal which make up the connecting wire. This alloy can include several metals, such as gold, silver, aluminium and their alloys, possibly with doping impurities added.

The main drawback of this process comes from the great difference between the coefficients of thermal expansion of the metal wires usually utilized and the silicon, which creates strong mechanical stresses liable to cause incipient ruptures into the crystal leading to contacts with poor electrical qualities.

A second well-known alloying process for obtaining ohmic contacts consists in alloying to the silicon a metallic layer obtained by one of the techniques quoted above. A second metallic layer is subsequently deposited on the alloy thus obtained so as to easily weld the connecting wire.

At the present time, the best way to obtain ohmic contacts by alloying is to use an initial coating of nickel heated up to about 700° C. to form an alloy between the nickel and the silicon, then to deposit on this alloy a second coating of nickel or copper allowing the welding of the connecting wire.

The purpose of the present invention is to make it possible to obtain, by alloying, a contact giving excellent electrical results both on P-type and N-type silicon, and formed according to a special process of vapor coating.

The method consists in depositing on the surface of a semiconductor element, particularly of the silicon type, able to withstand without risk of deteriorating, a thermal treatment of about 600° C., a metallic film of a complex nature according to a process entailing an initial stage, in the course of which the surface of the semiconductor element alloys with a metallic layer formed by an alloy obtained from the mixture of vapors of gold on the one hand and one of the metals of the group including copper, nickel, iron, zinc and their alloys on the other hand, and a second stage, in the course of which the metallic film mentioned above is coated during a period of solidification with a surface film of gold.

It is on this latter film that the connecting wires are welded.

The case where the metal chosen in the group of metals is copper will be now described more in detail.

The process of the invention rests on the following considerations.

It is well known that the quality of an ohmic contact results in the characteristic metallographic structure of the aforesaid contacts.

If, for example, one endeavours to make a contact by employing pure gold by evaporation in vacuo and annealed at a temperature of about 400° C., it will be found that, as has been said, such a contact does not obey Ohm's law. The reason is that the very slight miscibility in the solid phase of gold and silicon renders apparent, at the contact level, crystalline and stoechiometrical discontinuities characteristic of eutectoidal structures.

In order to avoid these discontinuities, the method object of the invention utilizes, in the case of the example in consideration, an evaporation source made up of gold with copper added. The choice of copper is due to the fact that this metal is miscible both with gold and silicon. Moreover, copper forms with silicon a whole range of defined intermetallic compounds reciprocally soluble. It is the partial solubility of these components which reduces the structural discontinuities at the alloyed zone level and results in an improvement of the electrical conductivity in the alloy.

By continuing to coat with pure gold, by vaporization, the gold, copper and silicon alloy coating during its solidification period, one gradually passes from silicon to pure gold the effect of which is to equally reinforce the adhesion of the deposit and its protecting power.

Moreover, copper dissolved in regrowth silicon makes recombination levels appear in the middle of the semiconductor restricted band, the effect being to seriously impair the lifetime of the minority carriers and the rectifying character of the junction made by the silicon in contact with the ternary gold-copper-silicon alloy. The presence of copper makes this deteriorating effect more intense than with gold only, for the miscibility into solid phase of the copper in the silicon is about ten times greater than that of gold (cf. "Solid Solubilities of Impurity Elements in Germanium and Silicon," by F. A. Trumbore, "The Bell System Technical Journal," volume XXXIX, January 1960, No. 1, pages 205 to 233). The result of the deterioration of the lifetime, together with the increase of alloy conductivity, is a contact at the same time lacking in injecting power and resistance.

As has already been said, copper could be replaced by all metals which substantially answer to the solubility conditions cited above: nickel, iron, zinc and their alloys.

As for gold, its choice as a filler metal and welding flux is largely explained by the fusibility of its alloys with silicon and by its total chemical inertia.

The invention will now be described in detail in relation with the appended drawing in which:

FIG. 1 gives the diagram in section of a silicon diode equipped with ohmic contacts carried out in accordance with the invention.

Figures 2, 3:
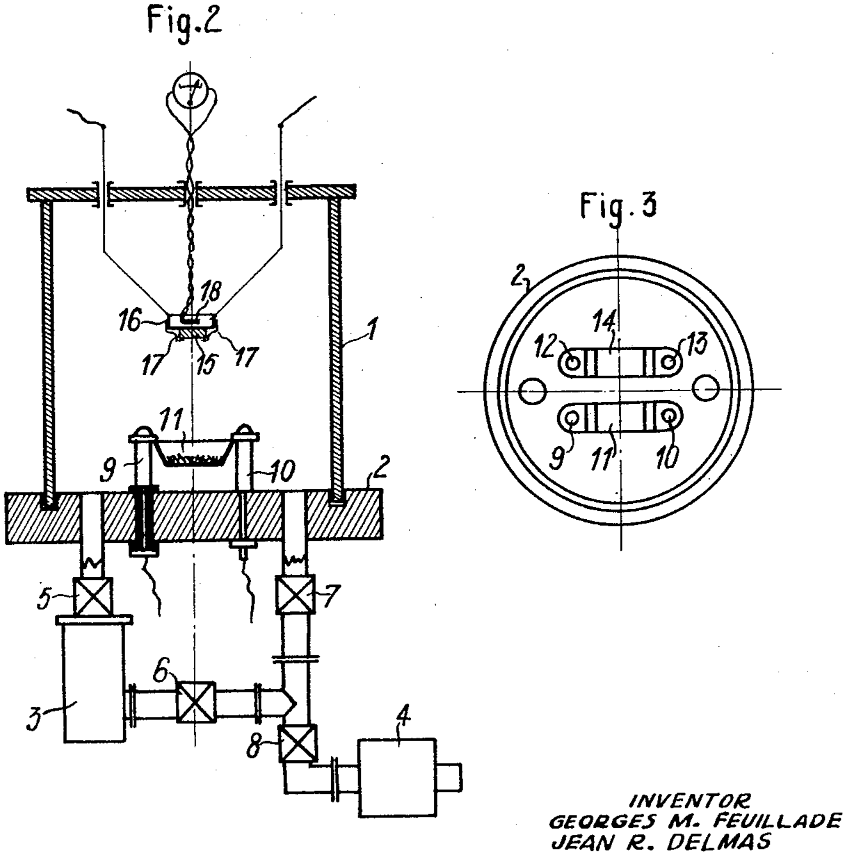

FIGS. 2 and 3 give a schematic display of an instrument making it possible to put the invention process into execution.

FIG. 1 shows a classical diode, made up of a P-type silicon crystal 20, for example, one face of which presents an N-type coating 21 obtained, for example, as it is well known, by phosphorus diffusion.

The terminal ohmic contacts 22 and 23 of this diode are coatings obtained in accordance with the invention, on which connecting wires 24 and 25 are welded by drops of welding alloy 26 and 27 moistening the gold.

The apparatus represented by FIG. 2 is composed of a chamber made up of a bell 1 resting on a plate 2.

Vacuum can be obtained in this chamber by the combined effect of a diffusion pump 3 and a primary vacuum pump 4. A set of valves 5, 6, 7 and 8 as well as appropriate tubing permit connecting the pumps and the chamber.

In the middle of the plate 2 are fixed side by side as indicated by FIG. 3, evaporator 11 containing a mixture of copper and gold, and evaporator 14 containing pure gold. These evaporators are electrically heated. Both are made of tungsten leaf, 0.3 mm. thick, deoxidized when heated in a reducing bath such as a solution of nitrite of sodium. These evaporators are supported by posts 9, 10, and 12, 13, respectively.

The silicon crystal 15 to be metallized is placed about 10 cm. above the evaporators 11 and 14. It is fixed to a heating support 16 by a clip 17. On this support is also placed a thermocouple 18 in contact with the silicon crystal 15 in order to check the temperature of this crystal in the course of the metallization.

The procedure to be followed is as follows:

The crystal should be perfectly cleaned beforehand. Among other methods, the following procedure gives excellent results:

Cleaning with boiling trichloroethylene during two minutes,
Etching with hydrofluoric acid for four minutes,
Washing with acetone with ultrasonic shaking.

Crystal 15 is placed in the chamber on its support 16. When the pressure obtained by the vacuum pumps 3 and 4 is about $10^{-5}$ millimeters of mercury, the silicon crystal is brought to a temperature of about 600° C. and evaporator 11 is then heated at a temperature permitting the simultaneous evaporation of the copper and gold. The intensity of the heating current of the evaporator 11 should be regulated so that the evaporation of the metals lasts at least until the temperature of the crystal during the cooling period of the latter reaches the value of 450° C.

When this initial vacuum evaporation is finished the second evaporator 14 is heated by regulating its heating current so that the evaporation of pure gold lasts at least until the temperature of the crystal during the cooling period of the latter reaches the value of 200° C. so as to obtain, as has already been described, a surface coating of pure gold with a crystalline structure.

When the vaporization of the gold is ended the heating of evaporator 14 is stopped and after the temperature of crystal 15 has gone down again to about 100° C. air may be admitted into chamber 1.

The weld of the connecting wires on the coating of pure gold is carried out according to already known processes, either with a weld moistening the gold (for example the gold-lead alloys) or by thermocompression.

To give a non restrictive example for contacts made on a rectifying layer whose thickness is sufficiently great (about 5 to 10 microns) so that the alloy of the invention does not destroy the rectifying effect, resistances of about 5 ohms per square millimeter have been obtained.

These contacts have been carried out with a silicon crystal plating obtained by placing:

(a) In evaporator 11 (FIG. 2) 20 milligrams of copper of a purity of 99.9, and 380 milligrams of gold of a purity of 99.9.
(b) In evaporator 14 (FIG. 3) 300 milligrams of gold.

To conclude, it should be noted that apart from the low resistance of contact obtained thanks to the invention process the metallic coatings produced are very adhesive to the silicon crystal and resist without deterioration all the usual etching baths including the fluoronitric etching solution generally designated under the name of "CP4," the surface coating of pure gold perfectly shielding the underlying alloy.

We claim:

1. The process of coating a silicon crystal to produce an adherent contact of low ohmic resistance and high tenacity, comprising, confining the crystal, together with discrete supplies of (1) gold and copper and (2) pure gold, in an atmosphere reduced to about $10^{-5}$ mm. of Hg, absolute, heating the crystal to about 600° C., heating supply (1) to vaporize the same and deposit on the crystal a first coating of gold-copper alloy, continuing heating of supply (1) while reducing the temperature of the crystal to about 450° C., heating supply (2) to vaporize the same and deposit on said first coating, a second coating of gold, and continuing heating of supply (2) while reducing the temperature of the crystal to about 200° C.

2. The process of coating a body of semiconductive material, comprising, confining said body in an atmosphere of about $10^{-5}$ mm. of Hg, absolute, heating said body to about 600° C., contacting said body with a vapor consisting of a mixture of gold and another metal selected from the group consisting of copper, nickel, iron, zinc, and alloys of the metals, to form on said material a first coating of an alloy of gold and said other metal, while reducing the temperature of the material to about 450° C., contacting said first coating with a vapor of pure gold to form thereon a second coating, while reducing the temperature of the material to about 200° C., cooling the material to about 100° C., and admitting air at atmospheric pressure to said material.

3. The process of coating a body of semiconductive material to produce an adherent contact of low ohmic resistance, comprising, enclosing said body within an evacuatable chamber, together with discrete supplies of (1) a mixture of gold and a metal selected from the group consisting of copper, nickel, iron, zinc and alloys of the metals, (2) pure gold, reducing the absolute pressure in said chamber to about $10^{-5}$ mm. of Hg, heating said body to about 600° C., heating supply (1) to vaporize the same while reducing the temperature of the body to about 450° C., discontinuing heating of supply (1), heatting supply (2) to vaporize the same, while reducing the temperature of the body to about 200° C., discontinuing heating of supply (2), discontinuing heating of said body, and admitting air to said chamber only after the temperature of said body has decreased to not more than 100° C.

4. The process of coating a body of silicon semiconductive material to produce an adherent contact of low ohmic resistance, comprising, enclosing the body within an evacuatable chamber, together with discrete supplies of (1) a mixture of gold and another metal selected from the group consisting of copper, nickel, iron, zinc, and alloys of the metals, (2) pure gold, reducing the absolute pressure in said chamber to about $10^{-5}$ mm. of Hg, heating the body to about 600° C., heating supply (1) only, to vaporize the same and deposit on said body a first coating of an alloy of gold with said other metal, continuing vaporization heating of supply (1) while reducing the temperature of the body to about 450° C., discontinuing heating of supply (1) when the temperature of the body has dropped to about 450° C., heating supply (2) to vaporize the same and deposit on said first coating a second coating of pure gold, continuing vaporization heating of supply (2) while reducing the temperature of the body to about 200° C., discontinuing heating of supply (2) when the temperature of the body has dropped to about 200° C., and admitting air to the chamber only after the temperature of the body has dropped to not more than 100° C.

5. The process of coating a semiconductive body of silicon to provide an adherent contact of low ohmic resistance, comprising, confining said body in an enclosure, together with discrete supplies of (1) gold and a metal miscible with both gold and silicon, (2) pure gold, reducing the absolute pressure in said enclosure to about $10^{-5}$ mm. of Hg, heating the body of silicon to about 600° C., heating supply (1) to vaporize the same and deposit upon the body a first coating of an alloy of gold and said metal, discontinuing heating of supply (1) when the temperature of the body has dropped to about 450° C., heating supply (2) to vaporize the same and deposit on said first coating, a second coating of gold, discontinuing heating of supply (2) when the temperature of the body has dropped to about 200° C., and admitting air at atmospheric pressure to said enclosure when the temperature of the body has decreased to not more than 100° C.

6. The process of coating a silicon crystal to produce an adherent contact therewith of low ohmic resistance, comprising, mounting the crystal within a chamber together with discrete, separably heatable supplies of (1) a mixture of copper and gold, (2) pure gold, reducing the absolute pressure in the chamber to about $10^{-5}$ mm. of Hg, heating the crystal to about 600° C., heating the gold-copper mixture to evaporate the same and deposit on the crystal a coating of gold-copper alloy, while reducing the temperature of the crystal to about 450° C., discontinuing the evaporation of the gold-copper mixture, and heating the supply of gold to deposit upon the gold-copper alloy coating of the crystal, a coating of pure gold while reducing the temperature of the crystal to about 200° C.

7. The process of claim 6, and admitting air at ambient pressure into said chamber only after the temperature of said crystal has decreased to not more than about 100° C.

8. The process of claim 7, heating of said crystal, gold-copper mixture, and gold being effected electrically.

References Cited by the Examiner

UNITED STATES PATENTS

| | | | |
|---|---|---|---|
| 2,586,752 | 2/52 | Weber et al. | 117—217 |
| 2,759,861 | 8/56 | Collins et al. | 117—107 X |
| 2,918,595 | 10/59 | Cressman | 117—107 X |
| 2,949,387 | 8/60 | Colbert et al. | 117—107 X |
| 2,953,484 | 9/60 | Tellkamp | 117—107 X |
| 2,995,473 | 8/61 | Levi | 117—201 |

RICHARD D. NEVIUS, *Examiner.*